United States Patent
Kato et al.

(10) Patent No.: US 12,082,983 B2
(45) Date of Patent: Sep. 10, 2024

(54) DENTAL TREATMENT APPARATUS

(71) Applicant: J. MORITA MFG. CORP., Kyoto (JP)

(72) Inventors: Kyohei Kato, Kyoto (JP); Kazunari Matoba, Kyoto (JP)

(73) Assignee: J. MORITA MFG. CORP., Kyoto (JP)

( * ) Notice: Subject to any disclaimer, the term of this patent is extended or adjusted under 35 U.S.C. 154(b) by 0 days.

(21) Appl. No.: 17/094,309

(22) Filed: Nov. 10, 2020

(65) Prior Publication Data
US 2022/0142732 A1    May 12, 2022

(51) Int. Cl.
*A61C 1/00* (2006.01)

(52) U.S. Cl.
CPC ............ *A61C 1/003* (2013.01); *A61C 1/0053* (2013.01)

(58) Field of Classification Search
CPC .......... A61C 1/003; A61C 1/0053; A61C 5/42
See application file for complete search history.

(56) References Cited

U.S. PATENT DOCUMENTS

| | | | |
|---|---|---|---|
| 5,980,248 A | 11/1999 | Kusakabe et al. | |
| 9,597,160 B1 * | 3/2017 | Gregg, II | A61C 8/0006 |
| 2011/0229839 A1 * | 9/2011 | Yamashita | A61B 5/4542 433/27 |
| 2013/0099710 A1 | 4/2013 | Okamoto | |
| 2015/0201918 A1 | 7/2015 | Kumar et al. | |
| 2019/0380813 A1 * | 12/2019 | Kato | A61C 1/003 |

FOREIGN PATENT DOCUMENTS

| | | | | |
|---|---|---|---|---|
| CN | 108712111 A | 10/2018 | | |
| DE | 202 07 967 U1 | 8/2002 | | |
| EP | 3 682 840 A1 | 7/2020 | | |
| JP | H08-000640 A | 1/1996 | | |
| JP | H09-38108 A | 2/1997 | | |
| JP | 2002345845 A * | 12/2002 | ............ | A61C 1/003 |
| JP | 2005-144194 A | 6/2005 | | |
| JP | 2006-263137 A | 10/2006 | | |
| JP | 4545326 B2 | 9/2010 | | |

(Continued)

OTHER PUBLICATIONS

Machine translation of WO 2018/168636 (Year: 2018).*

(Continued)

*Primary Examiner* — Heidi M Eide
(74) *Attorney, Agent, or Firm* — Osha Bergman Watanabe & Burton LLP

(57) ABSTRACT

A dental treatment apparatus includes: a handpiece including a head that holds a cutting tool; a drive unit capable of performing forward rotation driving for rotating the cutting tool held at the head in a cutting direction, and reverse rotation driving for rotating the cutting tool held at the head in a non-cutting direction; an operation receiving unit that receives an operation of an operator; and a controller that controls the drive unit that drives the cutting tool, according to the operation received by the operation receiving unit. Only when a prescribed condition is satisfied, the controller sets the operation received by the operation receiving unit as an operation to drive the cutting tool by reverse rotation driving, or as an operation to drive the cutting tool by twist driving by which the forward rotation driving and the reverse rotation driving are alternately performed.

11 Claims, 7 Drawing Sheets

(56) References Cited

FOREIGN PATENT DOCUMENTS

JP         2012-011068 A     1/2012
WO    WO 2018/168636    *  9/2018   ............... A61C 1/02

OTHER PUBLICATIONS

Extended European Search Report in counterpart European Application No. 20201575.6 issued Feb. 25, 2021 (7 pages).
Office Action in counterpart Japanese Patent Application No. 2019-110967 issued on Sep. 7, 2021 (6 pages).
Detailed Information Sheet in counterpart Japanese Patent Application No. 2019-110967 issued on Aug. 16, 2022 (4 pages).

* cited by examiner

DENTAL TREATMENT APPARATUS

BACKGROUND OF THE INVENTION

Field of the Invention

The present disclosure relates to a dental treatment apparatus including a handpiece, and particularly to a dental treatment apparatus for cutting an inner wall of a root canal of a tooth and enlarging the root canal.

Description of the Background Art

In dental treatment, treatment for cutting and enlarging a root canal of a tooth may be performed. The treatment is performed using a dental treatment apparatus that includes a handpiece having a head portion to which a cutting tool called a file or a reamer is attached, and this cutting tool is driven to cut and enlarge a root canal of a tooth. While the dental treatment apparatus drives the cutting tool to cut and enlarge a root canal of a tooth, a blade of the cutting tool bites into a wall of the root canal. Then, in the state where the cutting tool is captured in this portion where the blade bites, the cutting tool is further forcibly rotated, which may cause torsion and thereby fracture in the cutting tool.

A dental treatment apparatus disclosed in Japanese Patent Laying-Open No. 09-38108 aims to prevent breakage of a cutting tool by controlling a motor for driving a cutting tool to be stopped or reduced in number of rotations upon detection that a load torque applied to the cutting tool reaches a reference torque set in advance.

SUMMARY OF THE INVENTION

According to the dental treatment apparatus disclosed in Japanese Patent Laying-Open No. 09-38108, when the load torque equal to or greater than the reference torque set in advance is detected, rotation of the cutting tool is stopped, so that breakage of the cutting tool can be prevented. However, since rotation is forcibly stopped during cutting of a root canal, the rotation is stopped in the state where the blade of the cutting tool bites into the wall of the root canal. When the rotation is stopped in the state where the blade of the cutting tool bites into the wall of the root canal, the cutting tool cannot be readily pulled out from the root canal. In this case, the bite of the cutting tool needs to be released before the cutting tool can be pulled out. For releasing the bite of the cutting tool, the cutting tool needs to be driven by reverse rotation driving or twist driving.

However, in order to cause the cutting tool, which has been driven by forward rotation driving for cutting and enlarging the root canal, to be driven by reverse rotation driving or twist driving, complicated operations such as changing the driving mode were required. Particularly for operators who were not used to operating a dental treatment apparatus, it was complicated and significantly burdensome to perform the operation of releasing the bite of the cutting tool by changing the driving mode when rotation of the cutting tool was forcibly stopped in the state where the blade of the cutting tool bit into the wall of the root canal.

A dental treatment apparatus according to the present disclosure includes a handpiece, a drive unit, an operation receiving unit, and a controller. The handpiece includes a head that holds a cutting tool. The drive unit is capable of performing forward rotation driving for rotating the cutting tool held at the head in a cutting direction, and reverse rotation driving for rotating the cutting tool held at the head in a non-cutting direction. The operation receiving unit receives an operation of an operator. The controller controls the drive unit that drives the cutting tool, according to the operation received by the operation receiving unit. Only when a prescribed condition is satisfied, the controller sets the operation received by the operation receiving unit as an operation to drive the cutting tool by the reverse rotation driving or as an operation to drive the cutting tool by twist driving by which the forward rotation driving and the reverse rotation driving are alternately performed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (Overview)

Treatment for cutting and enlarging a root canal of a tooth is significantly difficult since the degree of curve of a root canal or the condition of calcification and clogging in the root canal are different from person to person. In the case where a root canal is cut and enlarged using a root canal treatment instrument as a dental treatment apparatus, a cutting tool is fractured due to cycle fatigue or torsional fatigue. Thus, a technique has been known for preventing breakage of the cutting tool by forcibly stopping driving of the cutting tool before the cutting tool is broken.

Figure 1:
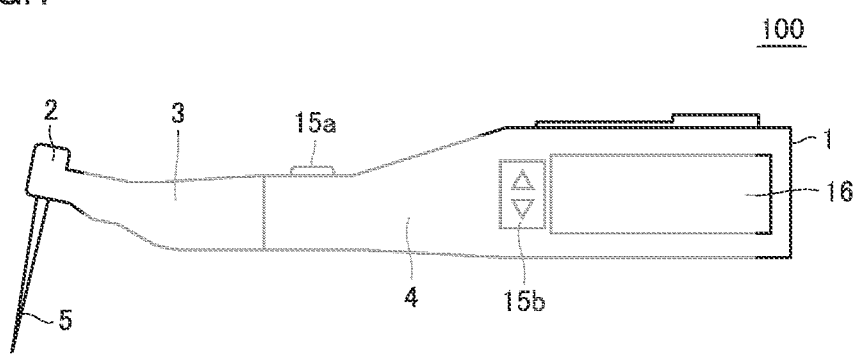
FIG. 1 is a schematic diagram showing a configuration of a root canal treatment instrument according to the present first embodiment.

When driving of the cutting tool is forcibly stopped before the cutting tool is broken, driving is stopped in the state where the blade of the cutting tool bites into the wall of the root canal, which may prevent the cutting tool from being readily pulled out from the root canal. This requires a bite releasing process in which the cutting tool is driven by reverse rotation driving or twist driving. However, complicated operations such as changing the driving mode were required for causing the cutting tool, which was driven by forward rotation driving for cutting and enlarging a root canal, to be driven by reverse rotation driving or twist driving. Furthermore, in the root canal treatment instrument of a cordless type as shown in FIG. 1 (described below), it was spatially difficult to provide a main body with a dedicated operation button (an operation receiving unit) for causing the cutting tool to be driven by reverse rotation driving or twist driving. Even if the main body has enough space, the design of the main body needed to be significantly changed.

Thus, in the root canal treatment instrument described in the present specification, only when prescribed conditions are satisfied such as a condition that the cutting tool is currently being driven, and a condition that driving of the cutting tool is forcibly stopped, an operation button is set as an operation button for driving the cutting tool by reverse rotation driving or twist driving. When no prescribed condition is satisfied, the operation button to be set is assigned with an operation other than the operation to drive the cutting tool by reverse rotation driving or twist driving. For example, the operation button to be set may be a driving start/stop button, a selection button for changing a setting, and the like.

In this way, only when a prescribed condition is satisfied, the operation button in the root canal treatment instrument is set as an operation button for driving (reverse rotation driving or twist driving) to perform a bite releasing process, and thereby, the operation to release the bite of the cutting tool can be less complicated. In particular, the root canal treatment instrument of a cordless type as shown in FIG. 1 does not have to include a dedicated operation button, which eliminates the need of significant design change. Specific embodiments will be hereinafter described in detail with reference to the accompanying drawings.

First Embodiment

Figure 2:
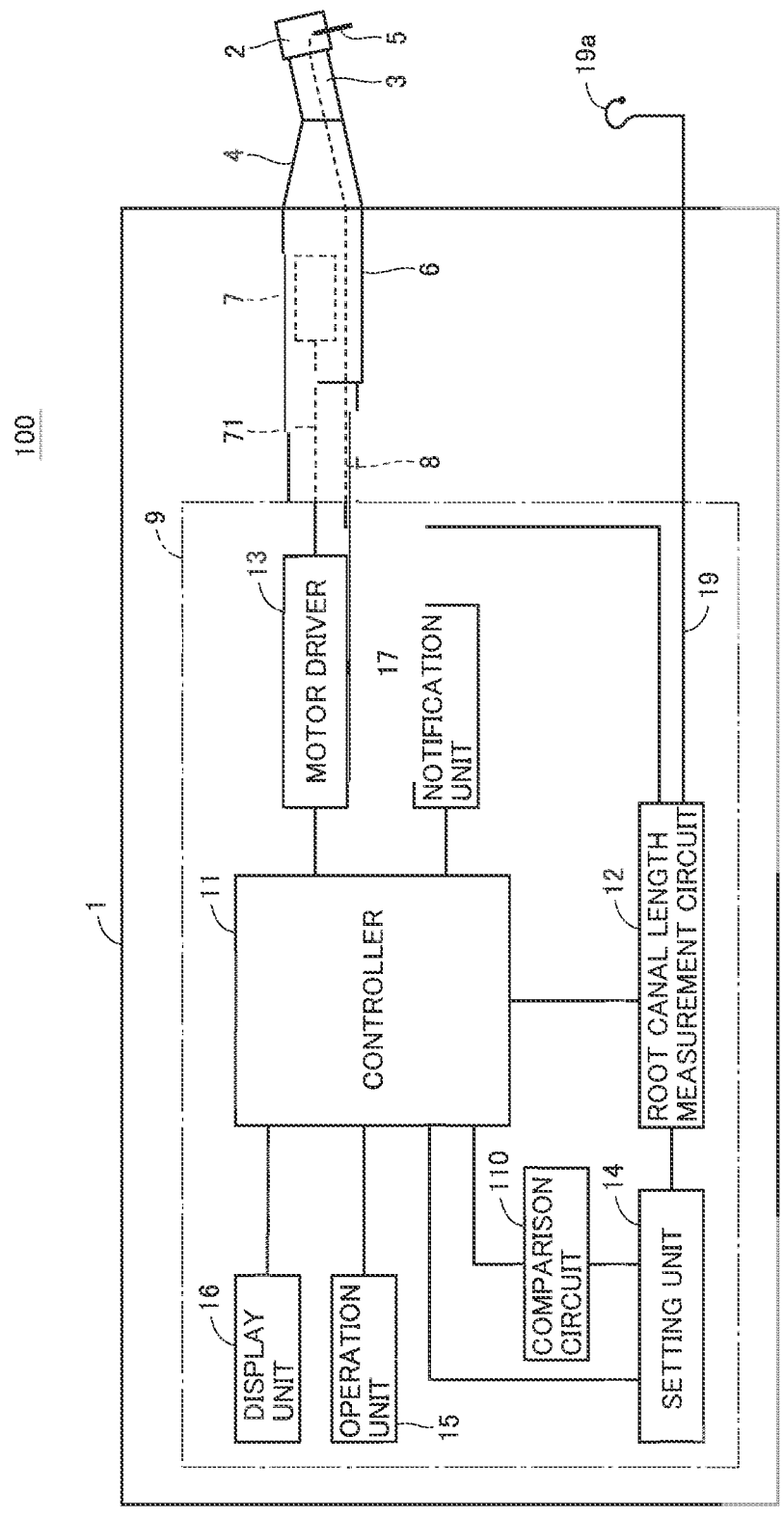
FIG. 2 is a block diagram showing the configuration of the function of the root canal treatment instrument according to the present first embodiment.

FIG. 1 is a schematic diagram showing a configuration of a root canal treatment instrument 100 according to the present first embodiment. FIG. 2 is a block diagram showing the configuration of the function of the root canal treatment instrument according to the present first embodiment. The dental treatment apparatus according to the present first embodiment will be described as root canal treatment instrument 100 including a handpiece 1 for dental root canal treatment together with a system for root canal enlargement and root canal length measurement. However, the dental treatment apparatus according to the present disclosure is not limited to root canal treatment instrument 100, but a dental treatment apparatus having the similar configuration may also be applicable. Furthermore, the dental treatment apparatus according to the present disclosure may be a root canal treatment instrument only for root canal enlargement without including a root canal length measurement system.

Root canal treatment instrument 100 shown in FIG. 1 includes handpiece 1 used for dental root canal treatment and including therein a motor unit 6 and a control box 9. In other words, root canal treatment instrument 100 shown in FIG. 1 is not configured such that handpiece 1 is coupled through a hose to a control box but configured as a root canal treatment instrument of a cordless type.

Handpiece 1 for dental root canal treatment includes: a head 2; a neck portion 3 having a small diameter and continuously connected to head 2; and a grip portion 4 continuously connected to neck portion 3 and gripped with a hand and fingers. Also, grip portion 4 incorporates motor unit 6 and control box 9 for rotatably driving a cutting tool 5 (a file or a reamer) held at head 2.

As shown in FIG. 2, motor unit 6 incorporates a micromotor 7 and is coupled to control box 9 through: a power supply lead 71 through which power is supplied to micromotor 7; a signal lead 8 through which a signal is transmitted to a root canal length measurement circuit 12 (described later); and the like. Signal lead 8 is a part of a conductor electrically connected to cutting tool 5 through motor unit 6 and handpiece 1 and transmitting an electrical signal. Cutting tool 5 serves as one electrode of root canal length measurement circuit 12.

Control box 9 includes a controller 11, a comparison circuit 110, a root canal length measurement circuit 12, a motor driver 13, a setting unit 14, an operation unit 15, a display unit 16, a notification unit 17, and the like. Although not shown in FIG. 1, lead 19 may be configured to extend out from grip portion 4, for example. Lead 19 has one end coupled to root canal length measurement circuit 12 and the other tip end equipped with a mouth cavity electrode 19a that is placed over a lip of a patient so as to be electrically connected. Mouth cavity electrode 19a serves as the other electrode of root canal length measurement circuit 12.

Controller 11 is responsible for overall control of the root canal enlargement and the root canal length measurement system, and includes a main portion implemented by a microcomputer. Comparison circuit 110, root canal length measurement circuit 12, motor driver 13, setting unit 14, operation unit 15, display unit 16, and notification unit 17 are connected to controller 11. Controller 11 controls the rotation direction of cutting tool 5 that cuts an object to be cut (a treatment portion). Specifically, controller 11 controls one of: forward rotation driving for causing cutting tool 5 to rotate in a forward rotation direction (in a clockwise (also called right rotation) direction); and reverse rotation driving for causing cutting tool 5 to rotate in a reverse rotation direction (in a counterclockwise (also called left rotation) direction). The rotation direction of the cutting tool (the clockwise direction or the counterclockwise direction) is defined based on a reference direction as seen from one end of cutting tool 5 attached to head 2 toward the other tip end of cutting tool 5. Controller 11 can control driving for rotating cutting tool 5 by changing parameters of an angle of rotation, a rotation speed, or an angular rotation speed (the number of rotations) in the clockwise direction, and an angle of rotation, a rotation speed, or an angular rotation speed (the number of rotations) in the counterclockwise direction, and also, the number of times of repetition.

The angle of rotation used herein is the amount of rotation showing the degree by which cutting tool 5 is rotated in the clockwise direction or in the counterclockwise direction, and may be defined by a time period for rotation (also called a time period for driving) obtained when the number of times of rotation or the angular rotation speed (the number of rotations) is set constant. The angle of rotation may also be defined by an amount associated with driving of cutting tool 5 such as an amount of a drive current or an amount of torque. Strictly speaking, for example, correspondence between the time period for rotation in terms of control and the actual angle of rotation may have to be corrected depending on the load applied to the cutting tool or the motor. However, the amount of correction is extremely small and hence it is ignorable in implementing the present disclosure.

Comparison circuit 110 is necessary for detecting a load applied to cutting tool 5 and can selectively be provided when detection of the load is required. Comparison circuit 110 can compare loads at any time point during rotation of cutting tool 5 in the clockwise direction or in the counterclockwise direction by motor driver 13. Specifically, comparison circuit 110 can compare a reference load with the load applied to cutting tool 5 after cutting tool 5 is rotated by a prescribed angle of rotation (for example, 180°) in the clockwise direction or in the counterclockwise direction.

Root canal length measurement circuit 12 is necessary for detecting a position of a tip end of cutting tool 5 inside a root canal, and can selectively be provided when detection of the position is required. Root canal length measurement circuit 12 forms a closed circuit including: cutting tool 5 inserted into a root canal of a tooth and defined as one electrode; and mouth cavity electrode 19a placed over a lip of a patient and defined as the other electrode. Root canal length measurement circuit 12 can measure a distance from the position of a root apex of a tooth to the tip end of cutting tool 5 by measuring an impedance between cutting tool 5 and mouth cavity electrode 19a by applying a measurement voltage across cutting tool 5 and mouth cavity electrode 19a. When root canal length measurement circuit 12 detects that the tip end of cutting tool 5 has reached the position of the root apex, the amount of insertion of the cutting tool (i.e., the distance from a root canal opening to the tip end of the cutting tool) can be defined as a root canal length. An electric root canal length measurement method for measuring a root canal length by measuring an impedance between cutting tool 5 and mouth cavity electrode 19a has been known, and all known electric root canal length measurement methods are applicable to root canal treatment instrument 100 according to the first embodiment.

Motor driver 13 is connected to micromotor 7 through power supply lead 71 and controls power supplied to micromotor 7 based on a control signal from controller 11. Motor driver 13 controls power supplied to micromotor 7, and thereby, can control the direction of rotation, the number of rotations, and the angle of rotation of micromotor 7, that is, the direction of rotation, the number of rotations and the angle of rotation of cutting tool 5. It should be noted that micromotor 7 and motor driver 13 mainly form the drive unit.

Setting unit 14 has a selection button 15b (see FIG. 1) provided on the surface of grip portion 4 for changing the settings. Selection button 15b is operated to thereby set references adopted for controlling the direction of rotation, the number of rotations and the angle of rotation of cutting tool 5. Furthermore, setting unit 14 can set parameters including the number of rotations and the angle of rotation of cutting tool 5 and can also set selection as to whether or not to measure a root canal length. Furthermore, setting unit 14 sets: a reference for switching that is compared by comparison circuit 110 with the load applied to cutting tool 5 (a reference based on which the parameter of the drive pattern or the drive sequence is switched); a reference load; timing; and the like. Selection button 15b is one embodiment of the "operation receiving unit" that receives operations such as a setting change in setting unit 14.

Operation unit 15 includes a driving start/stop button 15a (see FIG. 1) provided on the surface of grip portion 4. By operating driving start/stop button 15a, driving of cutting tool 5 can be started or stopped. Specifically, when driving start/stop button 15a is operated while driving of cutting tool 5 is stopped, operation unit 15 transmits an instruction signal to controller 11 to start driving of cutting tool 5. When driving start/stop button 15a is operated during driving of cutting tool 5, operation unit 15 transmits an instruction signal to controller 11 to stop driving of cutting tool 5. In this case, "during driving of cutting tool 5" means a time period from when driving of cutting tool 5 is started by the operation of driving start/stop button 15a to when driving is stopped by the operation of driving start/stop button 15a. Thus, at the time when driving of cutting tool 5 is forcibly stopped in the case where the detected load becomes equal to or greater than the reference load, driving of cutting tool 5 is stopped not by the operation of driving start/stop button 15a, and therefore, this time is assumed to be included in the time period during driving of cutting tool 5. Driving start/stop button 15a is one embodiment of a "forward rotation operation receiving unit" that receives an operation in operation unit 15, and one embodiment of the "operation receiving unit".

Display unit 16 shows the position of the tip end of cutting tool 5 inside a root canal, the direction of rotation, the number of rotations and the angle of rotation of cutting tool 5, and the like. Display unit 16 can also show information given from notification unit 17 to an operator. Root canal treatment instrument 100 of a cordless type includes display unit 16 provided on grip portion 14. Thus, without greatly changing a line of sight, an operator can check information such as whether cutting tool 5 is driven in the cutting direction or in the non-cutting direction, where cutting tool 5 is currently located, how much load is applied to cutting tool 5, or how high the number of rotations is.

Notification unit 17 gives a notification about the driving state of cutting tool 5 currently controlled by controller 11 through light, sound, or vibrations. Specifically, notification unit 17 is provided with a light emitting diode (LED), a speaker, or an oscillator as necessary for giving a notification about the driving state of cutting tool 5, and changes a color of the LED emitting light or changes sound output from the speaker between forward rotation driving and reverse rotation driving. When display unit 16 can show the driving state of cutting tool 5 to an operator, notification unit 17 does not have to separately include an LED, a speaker, or an oscillator.

Figure 3:
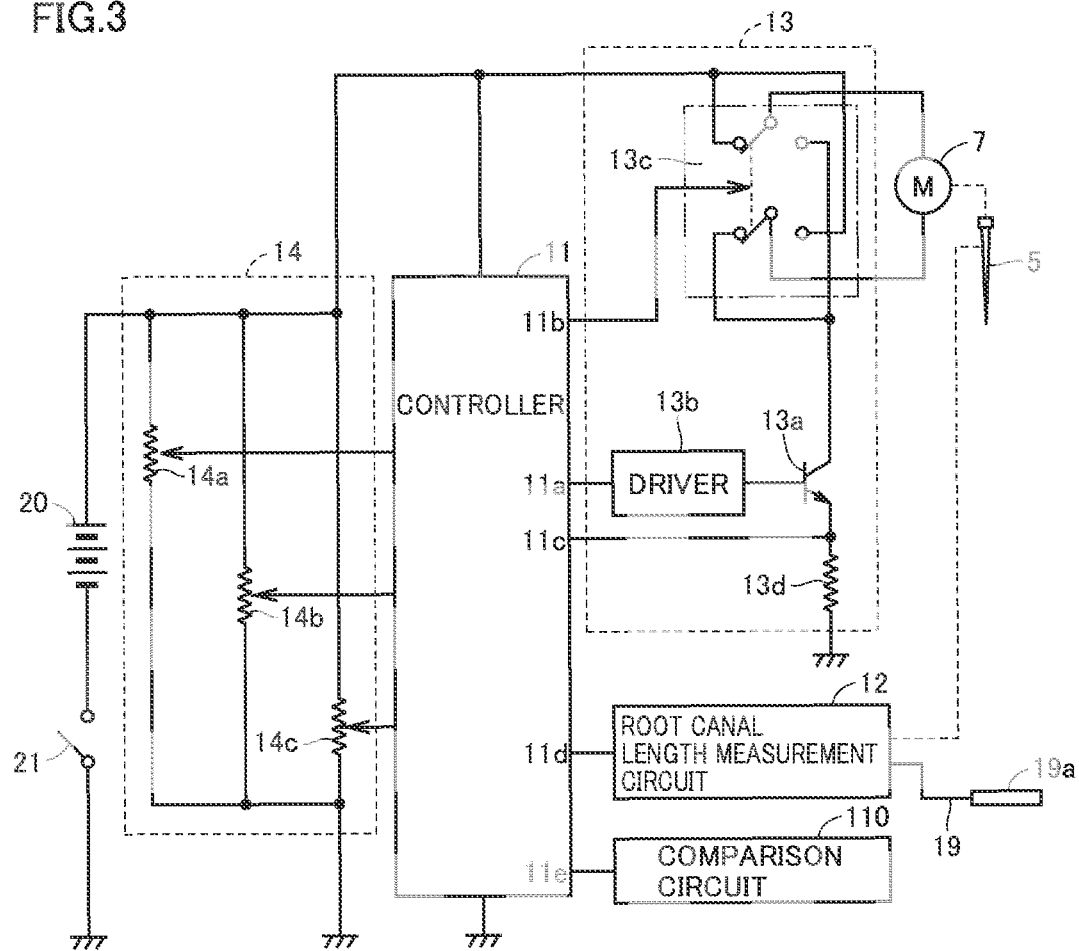
FIG. 3 is a circuit diagram showing a circuit configuration of the root canal treatment instrument according to the present first embodiment.

Then, the circuit configuration of root canal treatment instrument 100 that controls driving of cutting tool 5 will be described in greater detail. FIG. 3 is a circuit diagram showing a circuit configuration of root canal treatment instrument 100 according to the present first embodiment. FIG. 3 showing root canal treatment instrument 100 illustrates portions including micromotor 7, controller 11, comparison circuit 110, root canal length measurement circuit 12, motor driver 13, and setting unit 14, each of which is involved in driving control for cutting tool 5.

Furthermore, motor driver 13 includes a transistor switch 13a, a transistor driver circuit 13b, a rotation direction change-over switch 13c, and a load detection resistance 13d. Rotation direction change-over switch 13c will be described as a relay element, but a motor drive circuit may be formed of switch elements of semiconductors such as FET. Setting unit 14 includes a variable resistance 14a for reference load setting, a variable resistance 14b for duty setting, and a variable resistance 14c for reference position setting. Setting unit 14 also includes a configuration for setting the angle of rotation (or the time period for rotation) that shows the timing at which comparison circuit 110 compares the detected load with a reference load, but FIG. 3 does not show this configuration. Furthermore, root canal treatment instrument 100 shown in FIG. 3 is connected to a main power supply 20 and a main switch 21. Although not shown, cutting tool 5 is held by micromotor 7 through an appropriate gear mechanism and the like.

Transistor driver circuit 13b is operated by a control signal output from a port 11a of controller 11 to control transistor switch 13a to be turned on and off to thereby drive micromotor 7. Micromotor 7 rotates in the clockwise direction or in the counterclockwise direction in accordance with the state of rotation direction change-over switch 13c. When the control signal output from port 11*a* of controller 11 has a pulse waveform that is repeated in a constant cycle, for example, the width of the pulse waveform (i.e., the duty ratio) is adjusted by variable resistance 14*b* for duty setting in setting unit 14. Micromotor 7 drives cutting tool 5 at the number of rotations corresponding to this duty ratio.

According to the control signal output from port 11*b* of controller 11, rotation direction change-over switch 13*c* switches cutting tool 5 to be driven in the clockwise direction or to be driven in the counterclockwise direction. Based on the amount of current (or the voltage value) in load detection resistance 13*d* input into port 11*c*, controller 11 detects the load applied to cutting tool 5. Thus, load detection resistance 13*d* functions as a load detection unit for detecting the load applied to cutting tool 5. The load detection unit is not limited to the configuration for detecting the load applied to cutting tool 5 based on the amount of current (or the voltage value) in load detection resistance 13*d*, but may have another configuration, for example, for detecting the load applied to cutting tool 5 by a torque sensor provided in a drive portion of cutting tool 5. The detected load is converted by controller 11, for example, into a torque value applied to cutting tool 5 and shown on display unit 16. Furthermore, comparison circuit 110 compares the torque value converted by controller 11 with the torque value that is set using variable resistance 14*a* for reference load setting. Comparison circuit 110 may also be configured to, without converting into a torque value, directly compare the amount of current (or the voltage value) in load detection resistance 13*d* with the amount of current (or the voltage value) in variable resistance 14*a*.

Furthermore, controller 11 receives, through port 11*d*, the root canal length measured by root canal length measurement circuit 12. Thus, root canal length measurement circuit 12 functions as a position detection unit that detects the position of the tip end of cutting tool 5 inside the root canal. Furthermore, controller 11 outputs the load, which has been applied to cutting tool 5 and detected by the load detection unit, through port 11*e* to comparison circuit 110 and receives, through port 11*e*, the comparison result obtained as a result of comparison with a reference load by comparison circuit 110. Thus, comparison circuit 110 functions as a load comparison unit that compares the load detected by the load detection unit with the reference load. Controller 11 may be formed of a collection of the configurations described in the above-mentioned analog circuit, as software in one microcomputer.

Figure 4:
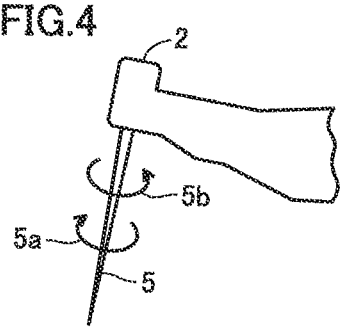
FIG. 4 is a schematic diagram showing the rotation direction of a cutting tool.

FIG. 4 is a schematic diagram showing the rotation direction of cutting tool 5. With reference to the rotation direction of cutting tool 5 as seen from one end of cutting tool 5 attached to head 2 toward the other tip end of cutting tool 5, FIG. 4 shows: driving in a clockwise direction 5*a* in which cutting tool 5 is rotated to the right; and driving in a counterclockwise direction 5*b* in which cutting tool 5 is rotated to the left. It should be noted that twist driving is implemented by alternately performing: driving cutting tool 5 to rotate in clockwise direction 5*a* at a predetermined angle of rotation; and driving cutting tool 5 to rotate in counterclockwise direction 5*b* at a predetermined angle of rotation.

[Bite Releasing Process]

Figure 5:
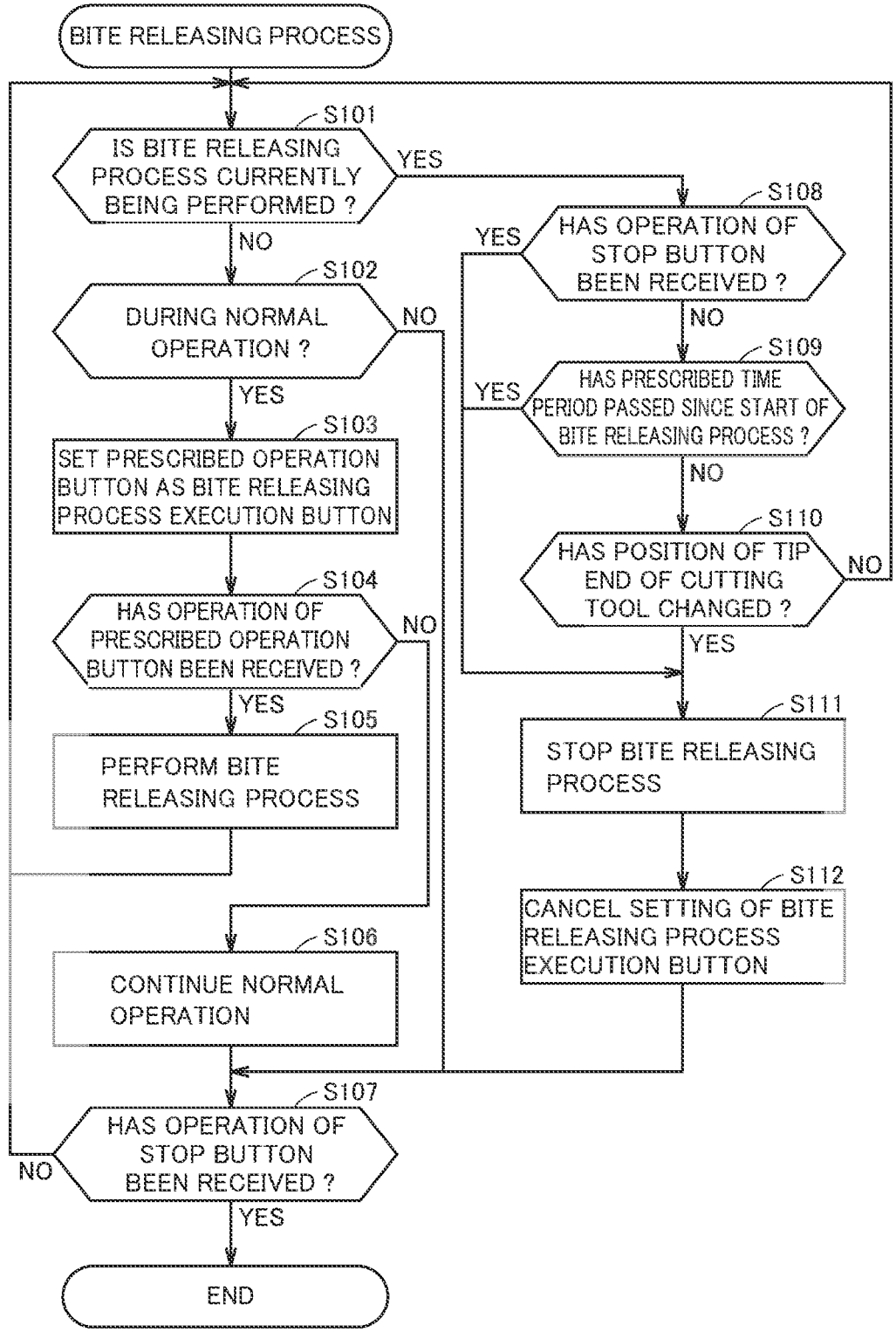
FIG. 5 is flowchart for illustrating a bite releasing process performed in the root canal treatment instrument according to the present first embodiment.

Then, the bite releasing process in root canal treatment instrument 100 according to the present first embodiment will be described. FIG. 5 is a flowchart for illustrating a bite releasing process performed in root canal treatment instrument 100 according to the present first embodiment. First, controller 11 determines whether the bite releasing process is currently being performed or not (step S101). In this case, the bite releasing process includes: the state where cutting tool 5 is driven by reverse rotation driving or twist driving in order to release the bite of the blade of cutting tool 5 into the wall of the root canal; or the state where a prescribed operation button (an operation receiving unit) is set as a bite releasing process execution button so as to allow execution of this driving.

When the bite releasing process is not currently being performed (NO in step S101), controller 11 determines whether cutting tool 5 is currently being performed in a normal operation or not (step S102). When cutting tool 5 is currently being operated in the normal operation (YES in step S102), controller 11 sets a prescribed operation button as a bite releasing process execution button (step S103). In this case, the prescribed operation button is a selection button 15*b* (see FIG. 1), for example. When this selection button 15*b* is pressed, controller 11 performs the bite releasing process to drive cutting tool 5 by reverse rotation driving or by twist driving. When selection button 15*b* is set as a bite releasing process execution button, display unit 16 may show a message, for notification, stating that the bite releasing process execution button is currently being set. When cutting tool 5 is not operated in the normal operation (NO in step S102), controller 11 proceeds the process to step S107.

Controller 11 determines whether the operation of the prescribed operation button has been received or not (step S104). When the operation of the prescribed operation button has been received (YES in step S104), controller 11 performs the bite releasing process to drive cutting tool 5 by reverse rotation driving or by twist driving in order to release the bite of the blade of cutting tool 5 into the wall of the root canal (step S105). When the operation of the prescribed operation button has not been received (NO in step S104), controller 11 causes cutting tool 5 to continuously operate in the normal operation (step S106).

After the process in step S102 or step S106, controller 11 determines whether the operation of the stop button has been received or not (step S107). Since a start button and a stop button are allocated to the same button in root canal treatment instrument 100 shown in FIG. 1, controller 11 determines whether the operation of driving start/stop button 15*a* has been received or not. When the operation of the stop button has been received (YES in step S107), controller 11 stops driving of cutting tool 5. When the operation of the stop button has not been received (NO in step S107), controller 11 returns the process to step S101.

When the bite releasing process is currently being performed (YES in step S101), controller 11 determines whether the operation of the stop button has been received or not (step S108). When the operation of the stop button has been received (YES in step S108), controller 11 proceeds the process to step S111. When the operation of the stop button has not been received (NO in step S108), controller 11 determines whether a prescribed time period (for example, 10 seconds) has passed or not since the start of the bite releasing process (step S109).

When the prescribed time period has not passed since the start of the bite releasing process (NO in step S109), controller 11 determines whether the position of the tip end of cutting tool 5 has changed or not (step S110). When the position of the tip end of cutting tool 5 has not changed (NO in step S110), controller 11 returns the process to step S101.

When the position of the tip end of cutting tool 5 has changed (YES in step S110), controller 11 stops the bite releasing process (step S111). Furthermore, controller 11 cancels the setting of the bite releasing process execution button (step S112). In this case, when the position of the tip end of cutting tool 5 has changed, controller 11 determines that the bite has been released, and then stops the bite releasing process and cancels the setting of the bite releasing process execution button.

Furthermore, when the prescribed time period has passes since the start of the bite releasing process (YES in step S109), controller 11 stops the bite releasing process (step S111), and cancels the setting of the bite releasing process execution button (step S112). This is for the purpose of preventing a prescribed operation button from being continuously set as the bite releasing process execution button for a long time period. In other words, while the bite releasing process continues, the original operation by selection button 15*b* cannot be performed, and also, cutting tool 5 can be prevented from being erroneously driven by reverse rotation driving or by twist driving.

In the flowchart shown in FIG. 5, the determinations to stop the bite releasing process (step S111) and to cancel the setting of the bite releasing process execution button (step S112) include a combination of: the determination whether the operation of the stop button has been received or not (step S108); the determination whether a prescribed time period has passed or not since the start of the bite releasing process (step S109); and the determination whether the position of the tip end of cutting tool 5 has changed or not (step S110). However, the determinations to stop the bite releasing process (step S111) and to cancel the setting of the bite releasing process execution button (step S112) may be at least one of the determinations in steps S108 to S110. Furthermore, other determinations may be included as determinations to stop the bite releasing process (step S111) and to cancel the setting of the bite releasing process execution button (step S112).

As described above, root canal treatment instrument 100 according to the present first embodiment includes: handpiece 1 including head 2 that holds cutting tool 5; the drive unit capable of performing forward rotation driving for rotating cutting tool 5 held at head 2 in the cutting direction, and reverse rotation driving for rotating cutting tool 5 held at head 2 in the non-cutting direction; the operation receiving unit that receives an operation of an operator; and controller 11 that controls the drive unit that drives cutting tool 5 according to the operation received by the operation receiving unit. Only when a prescribed condition is satisfied, controller 11 sets the operation received by selection button 15*b* (the operation receiving unit) as an operation to drive cutting tool 5 by reverse rotation driving, or as an operation to drive cutting tool 5 by twist driving by which forward rotation driving and reverse rotation driving are alternately performed. Thus, for root canal treatment instrument 100 according to the present first embodiment, the operation for releasing the bite of cutting tool 5 can be less complicated.

The prescribed condition is defined as a condition that cutting tool 5 is currently being driven. In other words, when selection button 15*b* is operated while cutting tool 5 is being operated in the normal operation, controller 11 sets an operation to drive cutting tool 5 by reverse rotation driving, or sets an operation to drive cutting tool 5 by twist driving by which forward rotation driving and reverse rotation driving are alternately performed. Accordingly, while cutting tool 5 is being operated in the normal operation, the bite releasing process can be performed only by operating selection button 15*b*, and thereby, the operation to release the bite of cutting tool 5 can be less complicated.

When a prescribed time period has passed since the prescribed condition was satisfied, controller 11 may cancel the setting in the operation receiving unit that is set to drive cutting tool 5 by reverse rotation driving or that is set to drive cutting tool 5 by twist driving. Thereby, controller 11 can prevent cutting tool 5 from being erroneously driven by reverse rotation driving or twist driving.

The operation receiving unit may be provided separately from the forward rotation operation receiving unit that receives the operation to drive cutting tool 5 by forward rotation driving. In controller 11, specifically, driving start/stop button 15*a* for forward rotation driving and selection button 15*b* for setting the bite releasing process execution button are separately provided. Thereby, driving start/stop button 15*a* for forward rotation driving and selection button 15*b* for execution of the bite releasing process can be clearly separated. Also, not selection button 15*b* but driving start/stop button 15*a* may be set as a bite releasing process execution button.

When the forward rotation operation receiving unit receives the operation again after the prescribed condition is satisfied, controller 11 may cancel the setting in the operation receiving unit that is set to drive cutting tool 5 by reverse rotation driving or that is set to drive cutting tool 5 by twist driving. Specifically, when driving start/stop button 15*a* is operated again to perform the stop operation while the bite releasing process is being performed, the setting of selection button 15*b* that is set as a bite releasing process execution button is canceled. In this case, driving start/stop button 15*a* is implemented by one operation button including a start button and a stop button. However, even when the operation button configured only as a start button is operated again during execution of the bite releasing process, the setting of selection button 15*b* is similarly canceled. Thereby, cutting tool 5 can be driven while prioritizing the operation of the operator.

The operation receiving unit may be provided in handpiece 1. Specifically, in root canal treatment instrument 100 shown in FIG. 1, selection button 15*b* is provided on handpiece 1. This eliminates the need for the operator to perform an operation at a position away from handpiece 1, so that the operation burden on the operator can be reduced.

A notification unit is further provided that notifies an operator that, when a prescribed condition is satisfied, controller 11 has set the operation in the operation receiving unit as an operation to drive cutting tool 5 by reverse rotation driving or by twist driving. Specifically, controller 11 causes display unit 16 to show a message for a notification, for example, stating that the bite releasing process execution button is currently being set. Display unit 16 is one embodiment of the notification unit, and other notification units 17 such as a speaker may give notifications.

Second Embodiment

Figure 6:
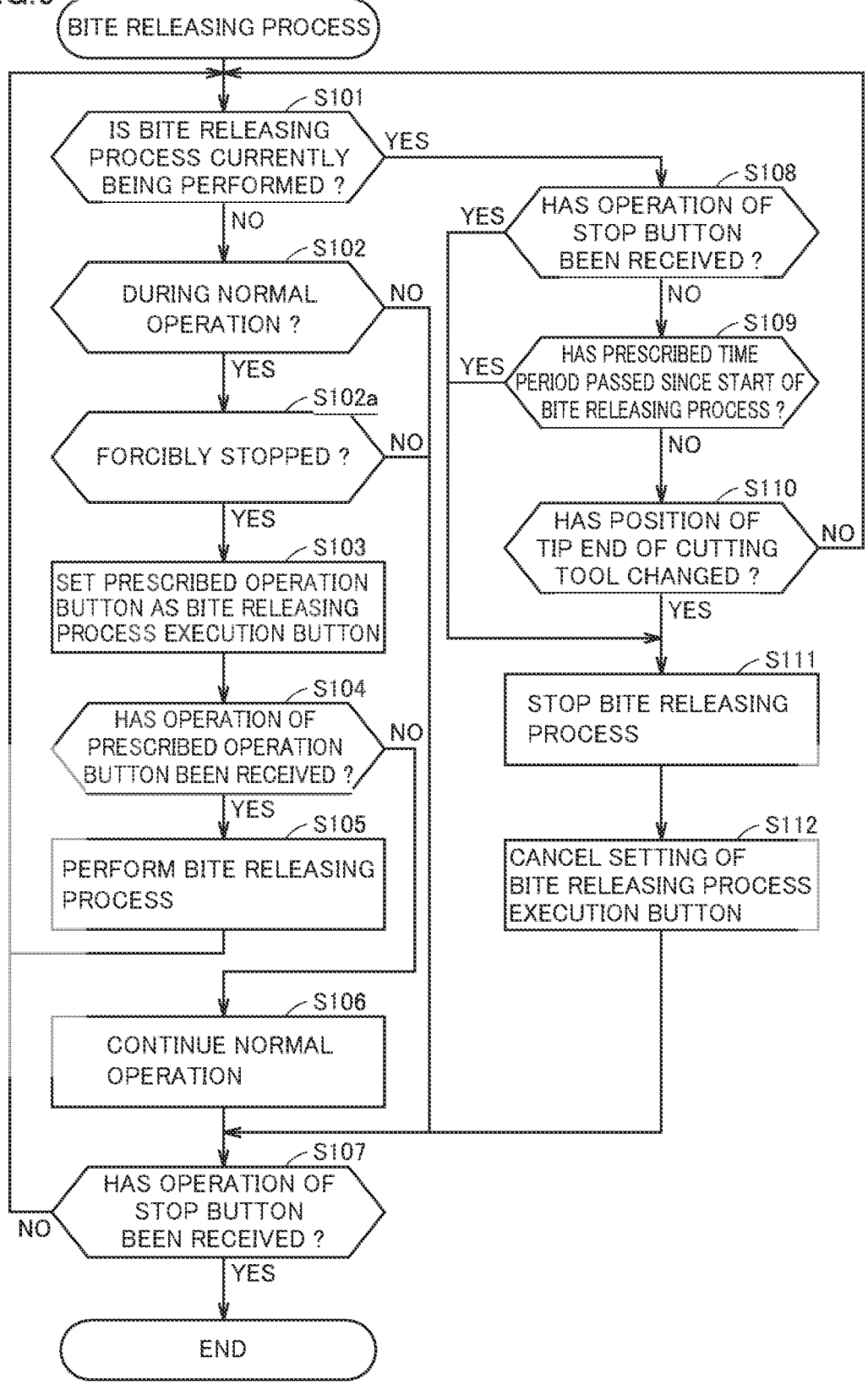
FIG. 6 is a flowchart for illustrating a bite releasing process performed in a root canal treatment instrument according to the present second embodiment.

As described with regard to root canal treatment instrument 100 according to the present first embodiment, on the condition that cutting tool 5 is currently being driven, the operation received by the operation receiving unit is set as an operation to drive cutting tool 5 by reverse rotation driving (a bite releasing process) or set as an operation to drive cutting tool 5 by twist driving by which forward rotation driving and reverse rotation driving are alternately performed (a bite releasing process). However, the above-mentioned condition is not limited to the condition that cutting tool 5 is currently being driven, and, in the root canal treatment instrument according to the present second embodiment, may also include a condition that driving is stopped despite that the operation to stop driving of cutting tool 5 has not been received. The bite releasing process in the root canal treatment instrument according to the present second embodiment will be hereinafter described with reference to a flowchart. FIG. 6 is a flowchart for illustrating the bite releasing process performed in the root canal treatment instrument according to the present second embodiment. It should be noted that root canal treatment instrument 100 according to the present second embodiment also has the same configuration as that of root canal treatment instrument 100 according to the first embodiment shown in FIGS. 1 to 3, and therefore, the same components will be denoted by the same reference characters, and the detailed description thereof will not be repeated.

First, controller 11 determines whether the bite releasing process is currently being performed or not (step S101). In this case, the bite releasing process includes: the state where cutting tool 5 is driven by reverse rotation driving or twist driving in order to release the bite of the blade of cutting tool 5 into the wall of the root canal; or the state where a prescribed operation button is set as a bite releasing process execution button so as to allow execution of the above-mentioned driving.

When the bite releasing process is not currently being performed (NO in step S101), controller 11 determines whether cutting tool 5 is currently being operated or not in the normal operation (step S102). When cutting tool 5 is currently being operated in the normal operation (YES in step S102), controller 11 determines whether driving of cutting tool 5 is forcibly stopped or not (step S102a). When driving of cutting tool 5 is forcibly stopped (YES in step S102a), controller 11 sets a prescribed operation button as a bite releasing process execution button (step S103). When cutting tool 5 is not operated in the normal operation (NO in step S102) and when driving of cutting tool 5 is not forcibly stopped (NO in step S102a), controller 11 proceeds the process to step S107. Since the subsequent processes are the same as those in the flowchart shown in FIG. 4 described with regard to root canal treatment instrument 100 according to the present first embodiment, the same processes will be denoted by the same reference characters, and the detailed description thereof will not be repeated.

The following is a further detailed explanation about the case where driving of cutting tool 5 is forcibly stopped in step S102a. First, as driving for preventing torsion fracture of cutting tool 5, driving is forcibly stopped when the load applied to cutting tool 5 becomes equal to or greater than a reference value. In other words, in the root canal treatment instrument according to the present second embodiment, driving of cutting tool 5 is forcibly stopped at the time when the load applied to cutting tool 5 as a result of biting of the blade of cutting tool 5 into the wall of the root canal becomes equal to or greater than a reference value.

Specifically, during normal driving of cutting tool 5, controller 11 causes the load detection unit to detect the load applied to cutting tool 5, and then, determines whether or not the detected load is equal to or greater than a reference load. When the detected load is equal to or greater than the reference load, controller 11 forcibly stops driving of cutting tool 5 for preventing torsion fracture.

It step S102a, as another example where driving of cutting tool 5 is forcibly stopped, driving is forcibly stopped when the position of the tip end of cutting tool 5 inside the root canal reaches the root apex position. In other words, the root canal treatment instrument according to the present second embodiment, driving of cutting tool 5 is forcibly stopped at the point of time when the position of the tip end of cutting tool 5 that is measured by root canal length measurement circuit 12 reaches the root apex position.

Specifically, during normal driving of cutting tool 5, controller 11 causes root canal length measurement circuit 12 to measure the position of the tip end of cutting tool 5, and then, determines whether the measured position of the tip end of cutting tool 5 has reached a reference position (for example, the root apex position) or not. On the condition that root canal length measurement circuit 12 is currently measuring the position of the tip end of cutting tool 5, controller 11 may set the operation received by the operation receiving unit as an operation to drive cutting tool 5 by reverse rotation driving (the bite releasing process) or as an operation to drive cutting tool 5 by twist driving by which forward rotation driving and reverse rotation driving are alternately performed (the bite releasing process). Furthermore, controller 11 forcibly stops driving of cutting tool 5 when the measured position of the tip end of cutting tool 5 reaches a reference position. On the condition that the position of the tip end of cutting tool 5 that is measured by root canal length measurement circuit 12 reaches the reference position and controller 11 stops driving of cutting tool 5, controller 11 may set the operation received by the operation receiving unit as an operation to drive cutting tool 5 by reverse rotation driving (the bite releasing process) or as an operation to drive cutting tool 5 by twist driving by which forward rotation driving and reverse rotation driving are alternately performed (the bite releasing process).

As described above, in root canal treatment instrument 100 according to the present second embodiment, on the condition that driving of cutting tool 5 is stopped despite that the operation to stop driving of cutting tool 5 has not been received, the operation received by the operation receiving unit is set as an operation to drive cutting tool 5 by reverse rotation driving (the bite releasing process) or as an operation to drive cutting tool 5 by twist driving by which forward rotation driving and reverse rotation driving are alternately performed (the bite releasing process). Thus, for root canal treatment instrument 100 according to the present second embodiment, the operation to release the bite of cutting tool 5 can be less complicated.

Root canal treatment instrument 100 according to the present second embodiment may further include a load detection unit that detects the load applied to cutting tool 5. The prescribed condition may be set as a condition that the load applied to cutting tool 5 and detected by the load detection unit becomes equal to or greater than a reference load, and then, controller 11 stops driving of cutting tool 5. Thereby, even when the blade of cutting tool 5 bites into the wall of the root canal and then driving of cutting tool 5 is forcibly stopped, the operation to release the bite of cutting tool 5 can be less complicated.

Root canal treatment instrument 100 according to the present second embodiment may further include a root canal length measurement circuit 12 that detects the position of the tip end of cutting tool 5 inside the root canal that is obtained by electrical root canal length measurement. The prescribed condition may be a condition that root canal length measurement circuit 12 is currently measuring the position of the tip end of cutting tool 5 inside the root canal. Thereby, the operation to release the bite of cutting tool 5 can be less complicated also during measurement of the position of the tip end of cutting tool 5 by root canal length measurement circuit 12. Furthermore, the prescribed condition may also be a condition that the position measured by root canal length measurement circuit 12 reaches the reference position (for example, the root apex position), and controller 11 stops driving of cutting tool 5. Thereby, even when the position of the tip end of cutting tool 5 reaches a prescribed position and driving of cutting tool 5 is forcibly stopped, the operation to release the bite of cutting tool 5 can be less complicated.

(Modifications)

(1) As described with regard to root canal treatment instrument 100 according to each of the first and second embodiments, on the above-mentioned conditions, the operation received by the operation receiving unit is set as an operation to drive cutting tool 5 by reverse rotation driving or as an operation to drive cutting tool 5 by twist driving by which forward rotation driving and reverse rotation driving are alternately performed. The above-mentioned conditions may be separately applied or may be applied as a combination of the plurality of conditions.

Figure 7:
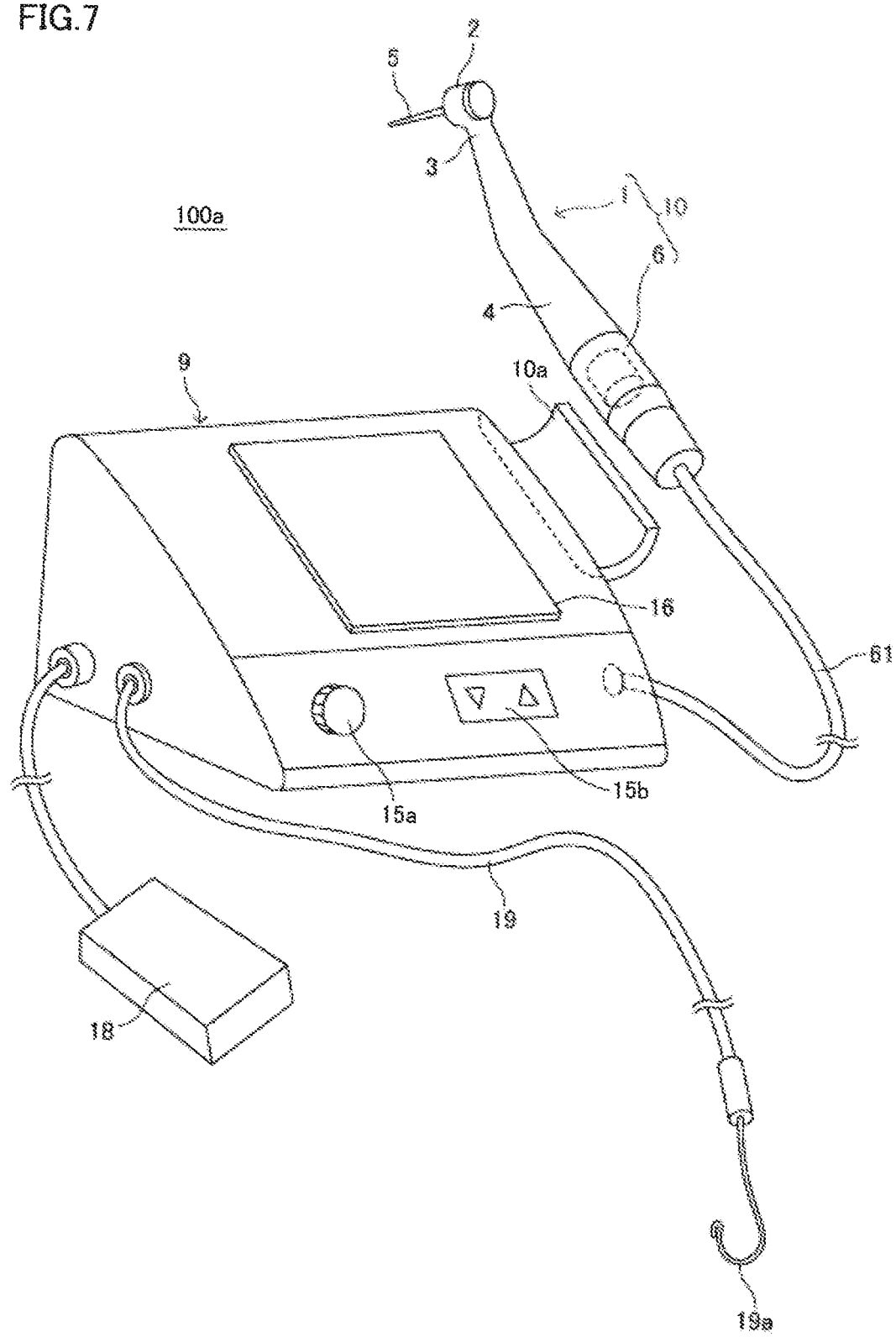
FIG. 7 is a schematic diagram showing a configuration of the root canal treatment instrument connected through a cord to a control box provided external to a handpiece.

(2) Root canal treatment instrument 100 according to each of the first and second embodiments has been described with regard to the configuration in which motor unit 6 and control box 9 are incorporated in the root canal treatment instrument of a cordless type, but the present disclosure is not limited thereto, and may have a configuration in which handpiece 1 is coupled through a hose 61 to control box 9 that is externally provided. FIG. 7 is a schematic diagram showing a configuration of a root canal treatment instrument 100*a* connected through a cord to control box 9 provided external to handpiece 1. In the configuration of root canal treatment instrument 100*a*, the same components as those shown in FIGS. 1 to 3 will be denoted by the same reference characters, and the detailed description thereof will not be repeated.

Root canal treatment instrument 100*a* shown in FIG. 7 includes a handpiece 1 for dental root canal treatment, a motor unit 6, and a control box 9. In handpiece 1 for dental root canal treatment, motor unit 6 for rotatably driving cutting tool 5 (a file or a reamer) held at head 2 is removably connected to a base portion of grip portion 4. A dental instrument 10 is configured with motor unit 6 coupled to handpiece 1.

Motor unit 6 incorporates a micromotor 7 and is coupled to control box 9 through hose 61 accommodating: power supply lead 71 through which power is supplied to micromotor 7; signal lead 8 through which a signal is transmitted to root canal length measurement circuit 12; and the like.

As shown in FIG. 7, control box 9 has a body side portion equipped with a holder 10*a* for holding instrument 10 while the instrument is not used. In control box 9, a foot controller 18 is coupled to controller 11 and a lead 19 is coupled to root canal length measurement circuit 12. Although lead 19 extends out from control box 9, it may extend so as to be branched from a point intermediate in hose 61.

Setting unit 14 includes a selection button 15*b* provided on the surface of control box 9 for changing the setting. Selection button 15*b* is operated to thereby set a reference adopted when controlling the direction of rotation, the number of rotations, the angle of rotation, and the like of cutting tool 5.

Operation unit 15 includes a driving start/stop button 15*a* provided on the surface of control box 9. Driving start/stop button 15*a* is operated to thereby allow driving of cutting tool 5 to be started or stopped.

Foot controller 18 serves as an operation receiving unit by which control by micromotor 7 to drive cutting tool 5 is applied through a stepping operation. Control by micromotor 7 to drive cutting tool 5 is not limited to control by foot controller 18, but an operation switch (not shown) may be provided in grip portion 4 of handpiece 1 so as to control driving of cutting tool 5 by using both the operation switch and foot controller 18. For example, rotation of cutting tool 5 may be started when root canal length measurement circuit 12 detects insertion of cutting tool 5 into a root canal while foot controller 18 is operated by foot stepping.

As in the configuration described above, control box 9 of root canal treatment instrument 100*a* is used while being placed on a tray table or a side table provided at a side portion of a dental treatment chair, but the present disclosure is not limited thereto, and control box 9 may be incorporated in the tray table or the side table.

(3) As described with regard to root canal treatment instrument 100 according to each of the first and second embodiments, micromotor 7 is employed as a source of motive power for driving cutting tool 5, but the present disclosure is not limited thereto and another drive source such as an air motor may be provided.

(4) In root canal treatment instrument 100 according to each of the first and second embodiments, controller 11 determines an operation receiving unit in advance that, when a prescribed condition is satisfied, sets an operation to drive cutting tool 5 by reverse rotation driving (the bite releasing process) or an operation to drive cutting tool 5 by twist driving by which forward rotation driving and reverse rotation driving are alternately performed (the bite releasing process). However, the present disclosure is not limited thereto, and an operator may determine an operation receiving unit that, when a prescribed condition is satisfied, sets an operation to drive cutting tool 5 by reverse rotation driving (the bite releasing process) or an operation to drive cutting tool 5 by twist driving by which forward rotation driving and reverse rotation driving are alternately performed (the bite releasing process).

(5) As described with regard to root canal treatment instrument 100 according to the each of the first and second embodiments, selection button 15*b* is set as an operation receiving unit that, when a prescribed condition is satisfied, sets an operation to drive cutting tool 5 by reverse rotation driving (the bite releasing process) or an operation to drive cutting tool 5 by twist driving by which forward rotation driving and reverse rotation driving are alternately performed (the bite releasing process). However, the present disclosure is not limited thereto, and not only selection button 15*b* but also driving start/stop button 15*a* or other operation receiving units (for example, foot controller 18, and the like) may be set as an operation receiving unit for setting. When driving start/stop button 15*a* is set as an operation receiving unit for setting, cutting tool 5 is driven, in accordance with the number of times of operation, the operation time period and the like, by reverse rotation driving or by twist driving by which forward rotation driving and reverse rotation driving are alternately performed (the bite releasing process).

(6) As described with regard to root canal treatment instrument 100 according to each of the first and second embodiments, in order to release the bite of the blade of cutting tool 5 into the wall of the root canal during driving of cutting tool 5 by forward rotation driving, cutting tool 5 is driven by reverse rotation driving or by twist driving by which forward rotation driving and reverse rotation driving are alternately performed (the bite releasing process). However, the present disclosure is not limited thereto, and the bite releasing process can be similarly applied also when cutting tool 5 is driven in a driving pattern other than forward rotation driving. For example, the bite releasing process may be applied when cutting tool 5 is driven in a driving pattern formed in a combination of forward rotation driving and reverse rotation driving so as to cut and enlarge the root canal of the tooth, or when cutting tool 5 is driven by twist driving so as to cut and enlarge the root canal of the tooth.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A dental treatment apparatus comprising:
a handpiece including a head that holds a cutting tool for cutting or enlarging a root canal of a tooth;
a drive unit capable of performing forward rotation driving for rotating the cutting tool held at the head in a cutting direction, and reverse rotation driving for rotating the cutting tool held at the head in a non-cutting direction;
an operation button;
a controller that controls the drive unit that drives the cutting tool according to a prescribed condition,
wherein only when the prescribed condition is satisfied, the controller sets the operation button as an operation button to drive the cutting tool by reverse rotation driving or by twist driving by which forward rotation driving and reverse rotation driving are alternately performed and
when the prescribed condition is not satisfied the controller sets the operation button as an operation button to drive the cutting tool with an operation other than by the reverse rotation driving or the twist driving.

2. The dental treatment apparatus according to claim 1, wherein the prescribed condition is defined as a condition that the cutting tool is being driven.

3. The dental treatment apparatus according to claim 1, wherein the prescribed condition is defined as a condition that driving of the cutting tool is stopped even when an operation to stop driving of the cutting tool is not received.

4. The dental treatment apparatus according to claim 3, further comprising a load detection unit that detects a load applied to the cutting tool, wherein the prescribed condition is defined as a condition that the load applied to the cutting tool and detected by the load detection unit is equal to or greater than a reference load.

5. The dental treatment apparatus according to claim 3, further comprising a position detection unit that detects a position of a tip end of the cutting tool inside a root canal, the position of the tip end being obtained by electrical root canal length measurement, wherein the prescribed condition is defined as a condition that the position detection unit is detecting the position of the tip end of the cutting tool inside the root canal.

6. The dental treatment apparatus according to claim 5, wherein the prescribed condition is defined as a condition that the position detected by the position detection unit reaches a reference position.

7. The dental treatment apparatus according to claim 1, wherein a prescribed time period passes since the prescribed condition is satisfied, the controller cancels the setting of the operation button to drive the cutting tool by the reverse rotation driving or by the twist driving.

8. The dental treatment apparatus according to claim 1, wherein the dental treatment apparatus further comprises a driving start/stop button, distinct from the operation button, the receives an operation to drive the cutting tool by forward rotation driving.

9. The dental treatment apparatus according to claim 8, wherein when the driving start/stop button receives an operation again after the prescribed condition is satisfied, the controller cancels the setting of the operation button to drive the cutting tool by the reverse rotation driving or by the twist driving.

10. The dental treatment apparatus according to claim 1, wherein the operation button is provided in the handpiece.

11. The dental treatment apparatus according to claim 1, further comprising a notification unit that notifies an operator that, when the prescribed condition is satisfied, the controller has set the operation button to the operation to drive the cutting tool by the reverse rotation driving or by the twist driving.

* * * * *